US010622900B1

(12) United States Patent
Wei et al.

(10) Patent No.: US 10,622,900 B1
(45) Date of Patent: Apr. 14, 2020

(54) SINGLE-INDUCTOR MULTIPLE-OUTPUT DC-DC CONVERTER

(71) Applicant: BravoTek Electronics Co., Ltd., Hsinchu County (TW)

(72) Inventors: Wei-Hsin Wei, Hsinchu County (TW); Yi-Cheng Hsu, Hsinchu County (TW); Wei-Lun Hsieh, Hsinchu County (TW)

(73) Assignee: BravoTek Electronics Co., Ltd., Zhubei (TW)

( * ) Notice: Subject to any disclaimer, the term of this patent is extended or adjusted under 35 U.S.C. 154(b) by 0 days.

(21) Appl. No.: 16/446,642

(22) Filed: Jun. 20, 2019

(51) Int. Cl.
*H02M 3/158* (2006.01)
*H02M 1/00* (2006.01)

(52) U.S. Cl.
CPC ....... *H02M 3/1584* (2013.01); *H02M 3/1582* (2013.01); *H02M 2001/009* (2013.01)

(58) Field of Classification Search
CPC ... H02M 2001/009; H02M 2001/0003; H02M 3/158; H02M 3/1582; H02M 3/1584; H02M 2003/1586
See application file for complete search history.

(56) References Cited

U.S. PATENT DOCUMENTS

| 2013/0193943 A1* | 8/2013 | Wilson | H02M 3/1582 323/284 |
| 2014/0354251 A1* | 12/2014 | Williams | H02M 3/158 323/271 |
| 2017/0366086 A1* | 12/2017 | Calhoun | H02M 3/158 |
| 2019/0068051 A1* | 2/2019 | Yang | H02M 3/04 |
| 2019/0245435 A1* | 8/2019 | Botti | B60R 16/033 |

\* cited by examiner

*Primary Examiner* — Yusef A Ahmed
*Assistant Examiner* — Shahzeb K Ahmad
(74) *Attorney, Agent, or Firm* — Chih Feng Yeh; Huntington IP Consulting Co., Ltd.

(57) ABSTRACT

Architecture and design techniques for a single inductor multiple-output (SIMO) DC-DC converter are presented. The SIMO DC-DC converter is based on ordered-power-distributive-control (OPDC) scheme with several novel control mechanism to optimize the performance of the power delivery capability, conversion efficiency and voltage ripple. In addition to buck mode outputs, the new SIMO DC-DC converter can also have an output channel operating at auto-buck-boost mode for the input voltage varying with the usage time.

11 Claims, 8 Drawing Sheets

SINGLE-INDUCTOR MULTIPLE-OUTPUT DC-DC CONVERTER

TECHNICAL FIELD

The present invention generally relates to DC-DC converters, and more particularly to a single-inductor multiple-output DC-DC converter.

BACKGROUND OF RELATED ART

Many of today's electronic systems require ultra-small size to meet consumers expected hearable and wearable functions with long on battery life despite their tiny form factor. However, the device size does limit the battery capacity. People expects their hearables, wearables, and other tiny, battery-powered electronic devices to perform reliably over long period of time.

To support the operation of these tiny, battery-powered electronic devices, from design point of view, the form factor limitations dictate the need for a small Li+ battery, which must last for a long time between charge cycles. Power supplies must meet the distinct and diverse voltage requirements of each sub-system within the design. Engineers face increasing challenges trying to pack all the necessary product features into a tiny form factor of an earbud or a wearable gadget such as ring, bracelet, or skin patch.

For meeting the requirement of small solution size for easy installation and low thermal fluctuation, tiny low-power power management ICs (PMICs) using space-saving single-inductor multiple-output (SIMO) technology are suitable for application of these systems.

A single-inductor multiple-output (SIMO) architecture provides a better solution for tiny devices requiring good thermal performance, by integrating functionality in smaller devices that would otherwise require multiple discrete components. The concept of SIMO DC-DC converters is arisen in order to overcome the disadvantage of conventional converter, such as complexity and high cost, especially, the need for multiple inductors and controllers. Since a SIMO DC-DC converter can support multiple outputs while using only one inductor, it is an excellent candidate to minimize the component count and thus reduce the production cost. Apparently, the area of print circuit board can be reduced greatly, thereby miniaturizing devices.

Figure 1A:
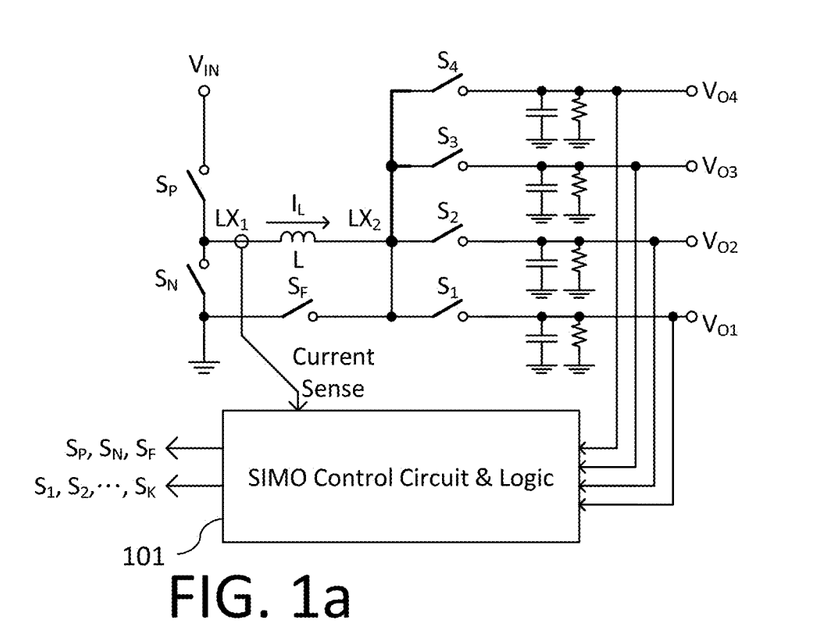
FIG. 1a illustrates a four-output SIMO DC-DC converter operated at time-multiplexing control scheme according to the related art.
Figure 1B:
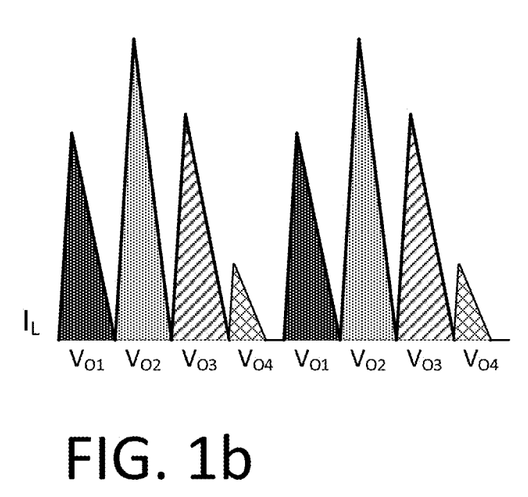
FIG. 1b illustrates an inductor current waveform for a time-multiplexing control (TMC) scheme according to the related art.

A related art example as depicted in FIG. 1a, a SIMO DC-DC converter can support four output stages ($V_{O1}$, $V_{O2}$, $V_{O3}$ and $V_{O4}$) while using only one inductor (L) which operates at time-multiplexing control scheme (TMC scheme) via a SIMO Control Circuit & Logic circuitry 101 to control the turning on/off periods of all switches and to generate duty cycles. The duty cycle signals must be generated to control the input switches $S_P$, $S_N$, the freewheel switch $S_F$ and output switches $S_1$, $S_2$, $S_3$, and $S_4$, respectively, for the voltage regulation of each output. For supplying each output node, the inductor is charged by a duty cycle to get a required energy for its corresponding output before discharged the required energy to the corresponding output load. Consequently, for a complete conversion cycle, as illustrated in FIG. 1b, the inductor is charged four times by connecting the inductor between Vin and ground, and is discharged to zero current four times by connecting the inductor between ground and each output. The energy delivered for each output is well controlled and independent of other outputs so that cross regulation is removed. However, the peak inductor current of the TMC scheme is large since the inductor current is charged from zero and discharged to zero for each output. The inductor current is operating at discontinuous conduction mode (DCM). Therefore, the total output current capability is limited and many charging/discharging cycles with high peak inductor current cause high switching loss and low conversion efficiency. Moreover, the TMC scheme also suffers from the trade-off between the output voltage ripple and the number of outputs. Increase of the number of outputs requires longer time to regulate and thus results in higher voltage ripple.

Figure 1C:
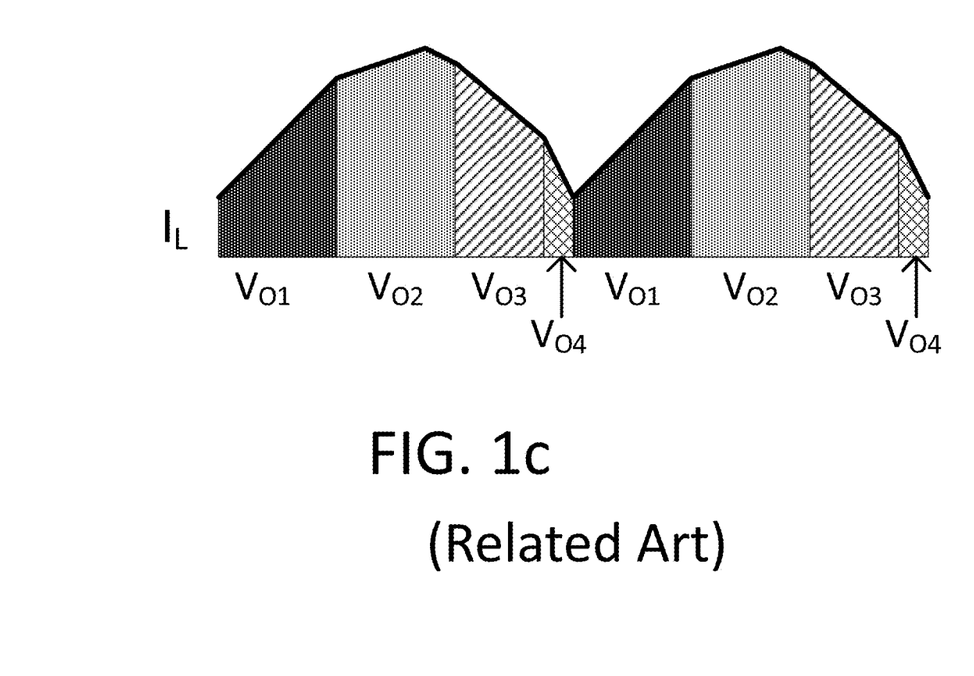
FIG. 1c illustrates an inductor current waveform for an ordered-power-distributive-control (OPDC) scheme according the related art.

In order to improve the power delivery capability, conversion efficiency and voltage ripple in TMC scheme, ordered-power-distributive control (OPDC) scheme distributes magnetic energy of the inductor to all the outputs sequentially at the same inductor energizing period. As shown by FIG. 1c, a charging duty cycle includes both charging the inductor current and discharging to output nodes, where each output switch is turned on at one time to share the inductor current. Since all outputs are regulated in one period, OPDC scheme can produce smaller voltage ripple for relative larger numbers of output channels. The inductor current is not necessary to be discharged to zero so that it can operates at continuous conduction mode (CCM), which has smaller peak inductor current. Therefore, smaller switching loss and higher output power delivery can be achieved.

However, due to the demand increased power efficiency in PMICs for hearables, wearables, and other tiny, battery-powered electronic devices, SIMO DC-DC converters as the key device should be also operated under various load conditions, such as continuous conduction mode (CCM) in heavy load condition, discontinuous conduction mode (DCM) in light load condition, and pulse skipping mode (PSM) in extreme light load or no load condition. Furthermore, the battery voltage is varying with the usage time. Under this application, auto-buck-boost function sometimes is required for the highest voltage channel. Therefore, a more advanced control scheme to optimize all operation modes and to have a buck-boost output channel is still demanding for realizing SIMO DC-DC converter into real applications.

SUMMARY

In this invention, a single-inductor multiple-output DC-DC converter with a buck-boost output channel, DCM, pulse-skipping mode and deadtime switch control is proposed.

A single inductor multiple-output DC-DC converter includes an inductor coupled to a first input switch and a second input switch to store energy from supply source, wherein the first input switch is coupled to an input supply node, and the second input switch is coupled to ground, the first and the second switches controlling current through the inductor; a plurality of output switches, each output switch coupled to a common inductor node and to a corresponding output supply node, each of the output supply node having a voltage converted from an input voltage received at an input supply node; a freewheel switch coupled between the common inductor node and ground; an oscillator provides a constant frequency clock cycle; wherein the control signal of the first input switch is response to the plurality of feedback signals and the sensed inductor current, and the second input switch having control signal is a non-overlap signal with the control of the first input switch; a control circuit receiving the sensed inductor current and the plurality of feedback signals indicating error signals between output voltages on the corresponding plurality of output supply nodes and their corresponding reference voltages, the control circuit being configured to control timing and charging of the inductor through activating one of the input switches and discharging of the inductor through activating one of the output switches sequentially; wherein the plurality of output switches, each of the output switch is response to their corresponding output voltage, reference voltage and sensed inductor current; wherein the plurality of output switches are turned on sequentially, the last output switch to be turned on having the remained time period after all the other output switches turned on sequentially; wherein a difference value between the error signal output corresponding to the last output switch and a linear sum of the error signal outputs corresponding to all of the remaining outputs switches, while the difference is positive and larger than a certain value, a freewheel duty cycle is inserted at the beginning of the cock period and before the output switches turned on sequentially.

In accordance with one aspect of the disclosure, the inductor current can be discharged to a zero current at a phase where the supply node are operated at light load condition.

In accordance with one aspect of the disclosure, the last output supply node enters pulse skipping mode at light load, control signal of the corresponding output switch is skipped and the freewheel switch is turned on for the remained clock period.

In accordance with one aspect of the disclosure, the plurality of output switches are turned on sequentially according to their corresponding output supply nodes with an order from the smallest (lowest) voltage to the highest voltage.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

As mentioned earlier, a buck-boost output channel is required for battery voltage varying with usage time in a SIMO DC-DC converter design while optimizing the power efficiency and the load driving capability are also very demanding. For achieving the real application requirement, a single-inductor multiple-output DC-DC converter with a buck-boost output channel, DCM, pulse-skipping mode and deadtime switch control is proposed in this invention.

Figure 2A:
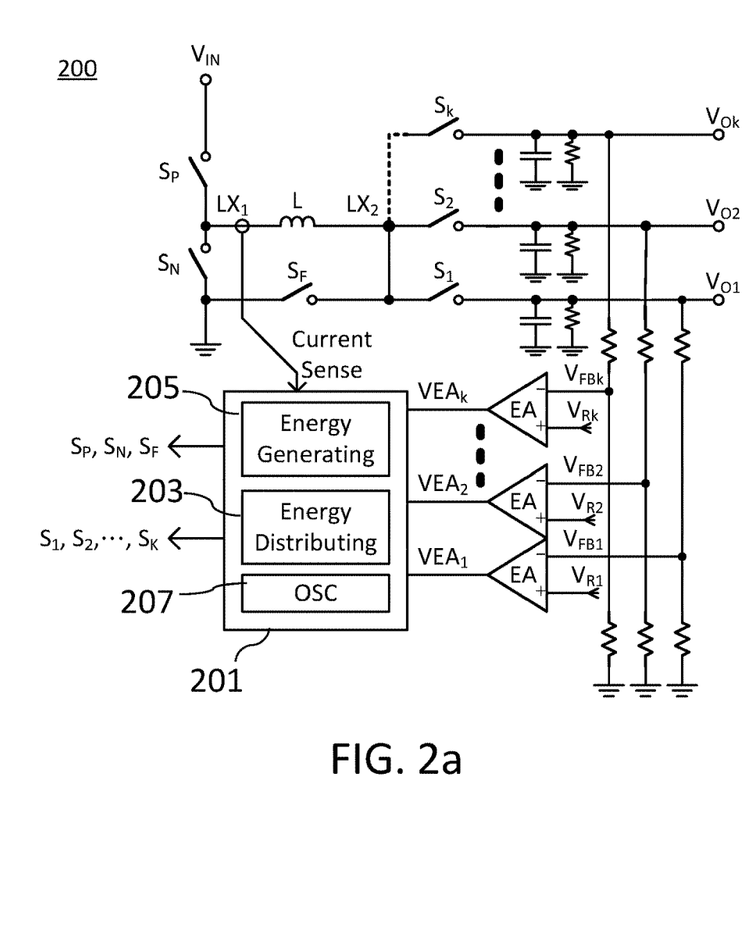
FIG. 2a illustrates the circuit of the single-inductor multiple-output (SIMO) DC-DC converter according to the present invention.

FIG. 2a illustrates the circuit of the single-inductor multiple-output (SIMO) DC-DC converter according to the present invention. The SIMO DC-DC converter 200, which can power multiple outputs $VO_1, VO_2, \ldots, VO_K$, includes an inductor L, a plurality of error amplifiers (EAs) $EA_1$, $EA_2, \ldots, EA_K$, in feedback loops, one control circuit 201 and a plurality of switches $S_P, S_N, S_F, S_1, S_2, \ldots, S_K$. The plurality of EAs are respectively put in the feedback loops of the multiple outputs ($VO_1, VO_2, \ldots, VO_K$) to sense their voltage level and each of them having an input reference voltage level ($VR_1, VR_2, \ldots,$ or $VR_K$) to individually control their error accordingly. The EA is, usually but not limited to one operational transconductance amplifier (OTA). A high side (first) input switch $S_P$, low side (second) input switch $S_N$, and the inductor L control energy acquired from the input source $V_{IN}$ and store the energy in the inductor. In SIMO converters, K additional output switches $S_1, S_2, \ldots, S_K$ are configured to appropriately allocate energy to K outputs $VO_1, VO_2, \ldots, VO_K$. Except for input switches $S_P, S_N$, and output switches $S_1, S_2, \ldots, S_K$, which are required in the basic topologies of SIMO converters, an auxiliary freewheel switch $S_F$ in FIG. 2a is additionally adopted for buck-boost output and pulse skip mode operation by introducing extra energy recovery duration.

In one embodiment of the present invention, one terminal LX1 of the inductor L coupled to input voltage $V_{IN}$ through the first input switch $S_P$ and coupled to ground through the second input switch $S_N$, output switches $S_1, S_2, \ldots, S_K$ coupled to a common inductor node LX2 and to a corresponding output supply node for allocating energy to outputs $VO_1, VO_2, \ldots, VO_K$. The freewheel switch $S_F$ is coupled to the common inductor LX2 and ground. The control circuit 201, which contains an energy distributing unit 203 to measure the energy required by all the outputs for ensuring no voltage error compared to the reference at each output, an energy generating unit 205 extracting energy from the input to ensure no total voltage error at all outputs, and an oscillator 207 to generate constant frequency PWM gate control signals, is used to control the turning on/off periods of all switches. The duty cycle signals must be generated to control the input switches $S_P$, $S_N$, the freewheel switch $S_F$ and output switches $S_1$, $S_2$, ..., $S_K$, respectively, for the voltage regulation of each output.

Figure 2B:
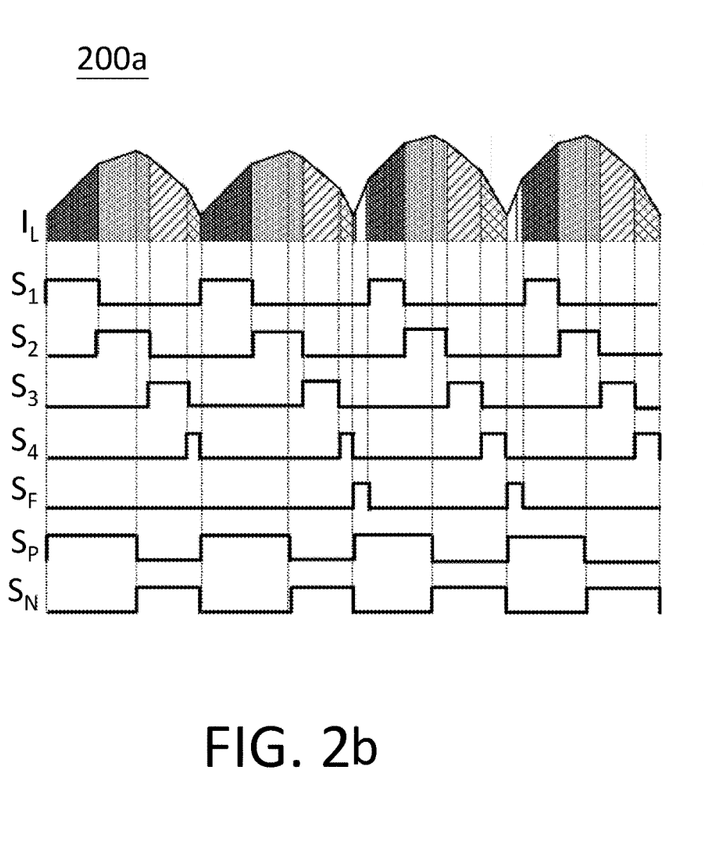
FIG. 2b illustrates the timing diagram of charge control signal of the SIMO DC-DC converter according to the preset invention.

FIG. 2b shows the timing diagram 200a of charge control signal of the SIMO DC-DC converter according to the present invention. In the beginning of the cycle, switch $S_P$ turns on to charge each output by turning on $S_1$ through $S_K$ one by one, i.e. all the outputs sequentially share the magnetic energy of the inductor. In one period, a charging procedure includes both charging and discharging the inductor current, the switches $S_1$ to $S_K$ are turned on one at a time in an increasing order to charge the corresponding outputs, where the output voltages have the order of $VO_K \geq VO_{K-1} \geq \ldots \geq VO_2 \geq VO_1$. A full range current sensing circuit (not shown) is used to provide sensing current for the energy distributing unit 203 in the control circuit 201. At the same time, a generated current by the current sensor input into the energy generating unit 205. The energy generating unit 205 measures the total voltage error at all the outputs through a feedback loop to provide an adequate amount of energy for the inductor L. The energy distributing unit 203 produces the control signals for the switches $S_1$, $S_2$ to $S_K$, and signals $VO_1$, $VO_2$ to $VO_K$ which contain the information of energy required by the output channels. The control circuit 201 receives error amplifier outputs, $VEA_k$, ..., $VEA_2$, $VEA_1$, responding to feedback signals, $V_{FB1}$, ..., $V_{FB2}$, $V_{FB1}$, indicating signals proportional to output voltages, $V_{Ok}$, ... $V_{O2}$, $V_{O1}$, on the output supply nodes, the control circuit 201 controlling the output switches for regulation of the output voltages in response to the feedback signals.

In operation, switches $S_P$ and $S_1$ are triggered by the oscillator 207 for a constant frequency operation. Voltage signals $S_P$, $S_N$, $S_F$, and $S_1$, $S_2$, ..., $S_K$ represent control signals (duty cycle signals) for switches $S_P$, $S_N$, $S_F$, $S_1$, $S_2$, ..., $S_K$, respectively. Switch control signal $S_P$ is responding to error amplifiers $EA_1$-$EA_K$ and inductor current $I_L$, switch control signal $S_N$ is a non-overlap signal with $S_P$. Switch control signal $S_1$ is responding to output voltage $VO_1$, reference voltage $VR_1$ and inductor current $I_L$, Switch control signal $S_2$ is responding to output signal $VO_2$, reference voltage $VR_2$ and inductor current $I_L$, ..., switch control signal $S_{K-1}$ is responding to output voltage $VO_{K-1}$, reference voltage $VR_{K-1}$ and inductor current $I_L$. Signal $S_K$ is the remained time period after switches $S_1$ to $S_{K-1}$ turned on sequentially, where the last output $VO_K$ can compensate for the changes of energy occurred at the prior outputs. However, while the last output operates at light load condition, the last output switch should be skipped at a clock time period to prevent too much power delivered to the last output. At the clock time period that the last output switch is skipped, the freewheel switch $S_F$ will be turned on for the remained time period after $S_1$ to $S_{K-1}$ turned on.

A SIMO DC-DC converter with the above control scheme can perform well for all outputs operating at buck mode, which means all output voltages are smaller than or equal to the input voltage. As the battery voltage varying lower and lower in the usage time period, some applications may need that the highest voltage output (also the last output) can operate at buck-boost mode.

Figure 2C:
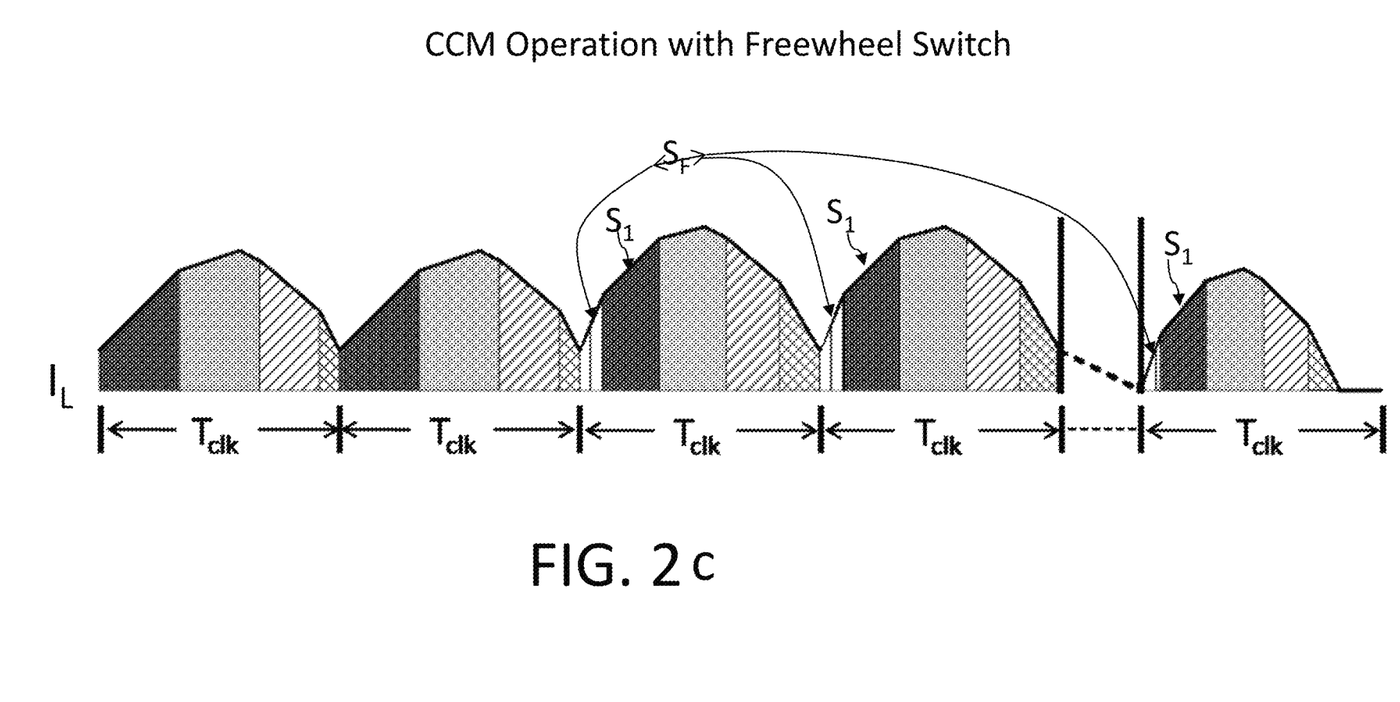
FIG. 2c illustrates the inductor waveform of the SIMO DC-DC converter during CCM operation with freewheel switch been turned on together with the first input switch at the beginning of the clock period according to the present invention.

In that case, a summing circuit (not shown) in the control circuit 201 calculates a difference value between the error amplifier output corresponding to the last output and a linear sum of the error amplifier outputs corresponding to all of the remaining outputs, while the difference is positive and larger than a certain value (system's output), a freewheel duty cycle is inserted at the beginning of the cock period and before the output switches turned on sequentially. The above description can be expressed in a more explicit way, if $VEA_k - (\alpha_{k-1} VEA_{k-1} + \ldots + \alpha_2 VEA_2 + \alpha_1 VEA_1) - V_{OS}$ is positive, a freewheel switch duty cycle proportional to $VEA_k - (\alpha_{k-1} VEA_{k-1} + \ldots + \alpha_2 VEA_2 + \alpha_1 VEA_1) - V_{OS}$ is inserted at the beginning of the clock period and before the output switches turned on sequentially, where $VEA_k$ is the error amplifier output corresponding to the last output, $VEA_{k-1}$, ..., $VEA_2$, $VEA_1$ represent error amplifier outputs of the remaining outputs, respectively; $\alpha_{k-1}$, ..., $\alpha_2$, $\alpha_1$ are constants representing the coefficients for each of the error amplifier output of the remaining outputs; $V_{OS}$ is a predetermined constant voltage value. An inductor current waveform of the SIMO DC-DC converter operating at CCM as illustrated in FIG. 2c, which shows the inductor current waveform during CCM operation with freewheel switch, here also demonstrates up to k=4, i.e. four output channels at CCM operation, freewheel switch $S_F$ turn on together with the first input switch $S_1$ at the beginning of the clock period (also refer to FIG. 2b) to provide sufficient charging current while the last output is in boost mode and with relative heavier load. In addition, in lighter load situation, as illustrated in FIG. 2d, the inductor current $I_L$ could be discharged to zero current at $S_K$ phase before the new clock cycle, i.e. entering into a discontinuous conduction mode (DCM).

Figure 2D:
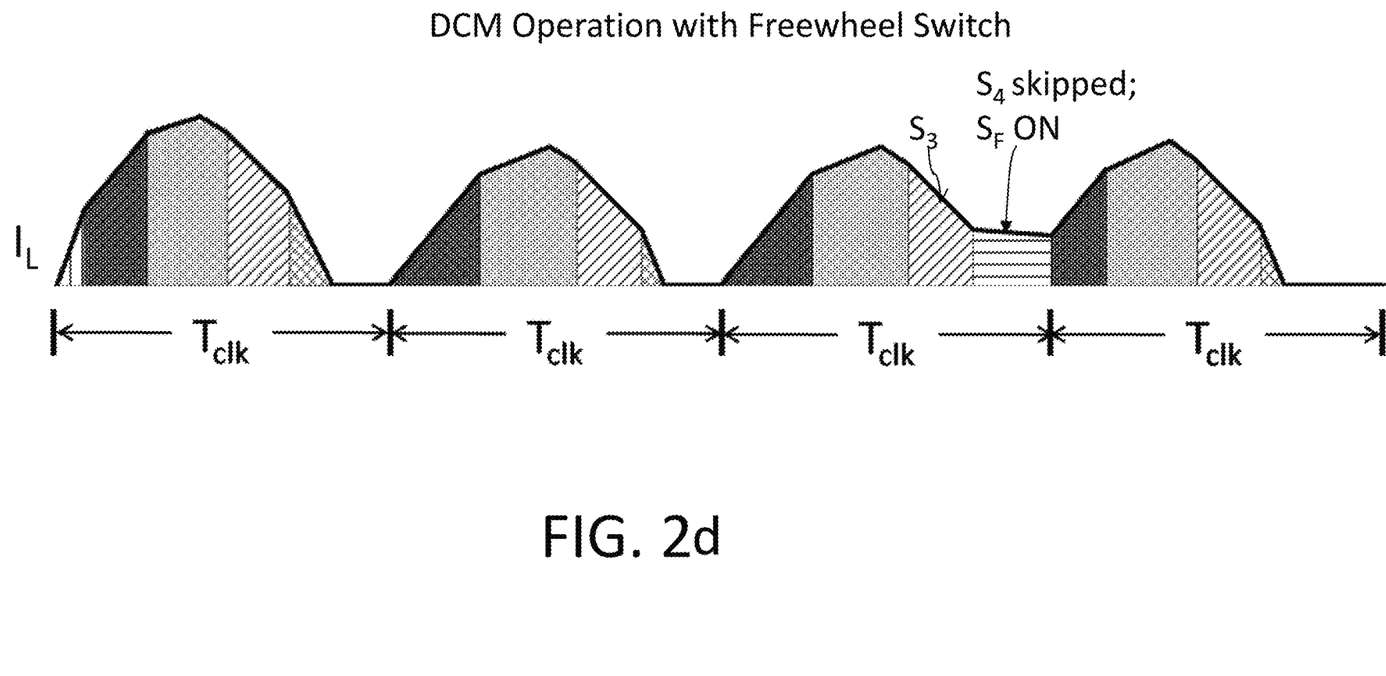
FIG. 2d illustrates the inductor waveform of the SIMO DC-DC converter during DCM operation with freewheel switch been turned on for the remaining clock period while the last output entering pulse skipping according to the present invention.

In a situation that one or plurality of the error amplifier outputs lower than a certain value, the corresponding one or plurality output switches is skipped at the corresponding duty cycle; in a case that the corresponding last error amplifier output is lower than a certain value, the corresponding output switch is skipped and the freewheel switch is turned on for the remained clock period, as illustrated in FIG. 2d.

In FIG. 2d, freewheel switch $S_F$ is turned on for the remained clock period ($T_{clk}$) while the last output $S_4$ enters pulse skipping.

In the absence of deadtime, simultaneously turning on any two output switches in $S_1$ to $S_K$ results in the leakage of energy from one output to the other. This deteriorates the regulation performance and efficiency. Thus, the deadtime between any two switches is necessary to avoid redundant energy transfer.

Referring to the circuit shown in FIG. 2a, only concentrated on the switch configuration part. Input switching device $S_N$, which may be a synchronous rectifier, can connect between node LX1 and ground to conduct inductor L current when switch $S_P$ is off. In this manner, the switching actions of $S_P$ and $S_N$ are substantially complementary. To prevent cross-conduction between $S_P$ and $S_N$, a relatively short deadtime interval can occur when both $S_P$ and $S_N$ are off. Switches $S_P$ and $S_N$ can be implemented in any suitable way, such as MOS transistors, as compared to diodes. If $S_P$ and $S_N$ are implemented using MOS transistors, internal body diodes can provide conduction for inductor L current during this deadtime interval. If switching devices $S_P$ and $S_N$ do not have internal body diodes, an external diode may be added in parallel with each switching device, where the diode anode can each connect to lower voltage node.

The switching action of $S_1$, $S_2$, ..., $S_K$ and $S_F$ can also be substantially complementary. In some applications, if an output voltage $VO_K$ is greater than an output voltage on $VO_{K-1}$, switching device $S_K$ can be replaced by a traditional rectifier diode with an anode connecting node LX2 and a cathode connecting to output $VO_K$. If switches $S_K$ and $S_{K-1}$ are implemented using MOS transistors, the anode of an internal body diode of $S_K$ can connect to node LX2, and the cathode of the internal body diode of $S_K$ can connect to node $VO_K$.

Figure 3A:
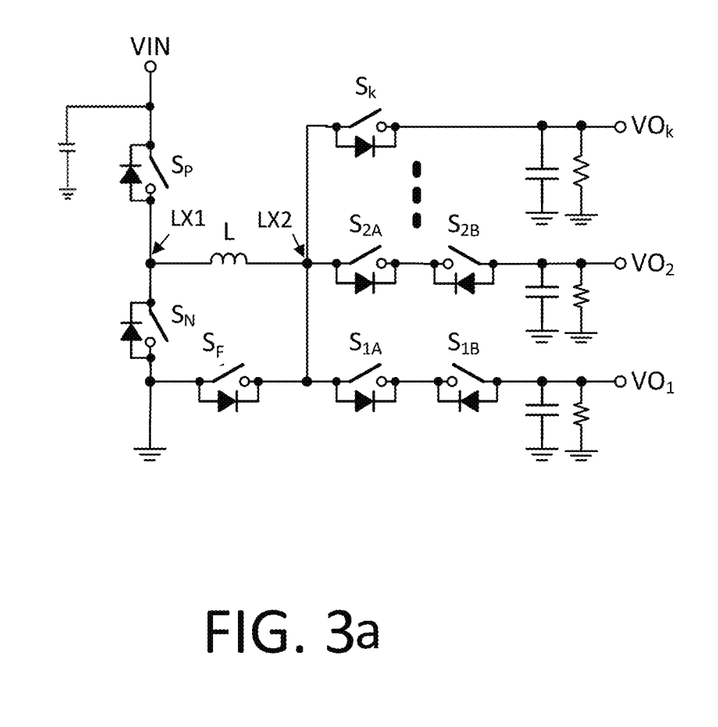
FIG. 3a-b illustrate a power stage with back-to-back switch configuration for the single-inductor multiple-output (SIMO) DC-DC converter according an embodiment of the present invention.
Figure 3B:
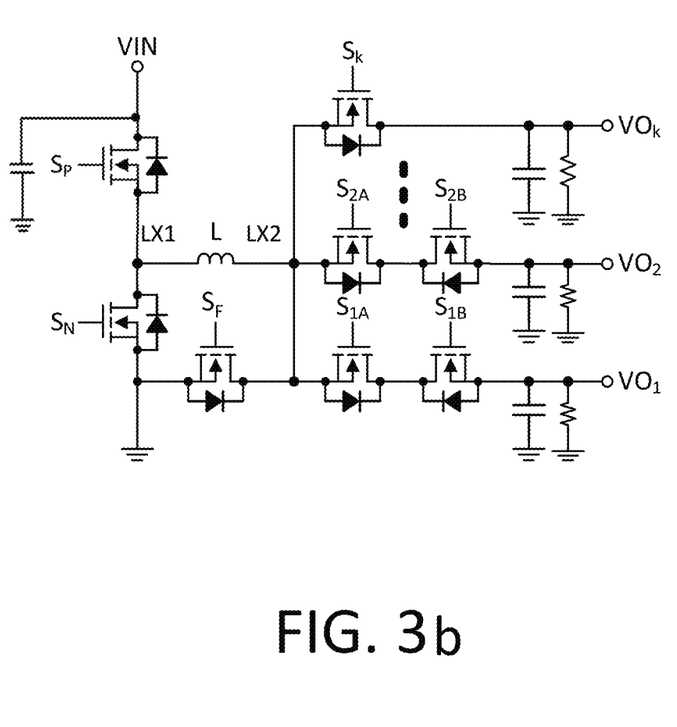

Referring to FIG. 3a, it shows a back-to-back switch configuration ($S_{K-1A}$, $S_{K-1B}$, ..., $S_{2A}$, $S_{2B}$, $S_{1A}$, $S_{1B}$) for all output switches except for the switch connecting to the highest output voltage rail. FIG. 3b shows an example that back-to-back switches are realized by NMOSFETs. Apparently, these switches can be also realized by PMOSFETs. Thus, the switch $S_K$ that connects to the highest output voltage $VO_K$ is configured to have a body diode having its anode connecting to node LX2 and cathode connecting to the output node $VO_K$; switches $S_1$, $S_2$, ..., $S_{K-1}$ are configured to in a way such that no body diode of the output switch can be turned on for voltage at node LX2 being higher or lower than $VO_1$, $VO_2$, ..., $VO_{K-1}$.

Figure 4A:
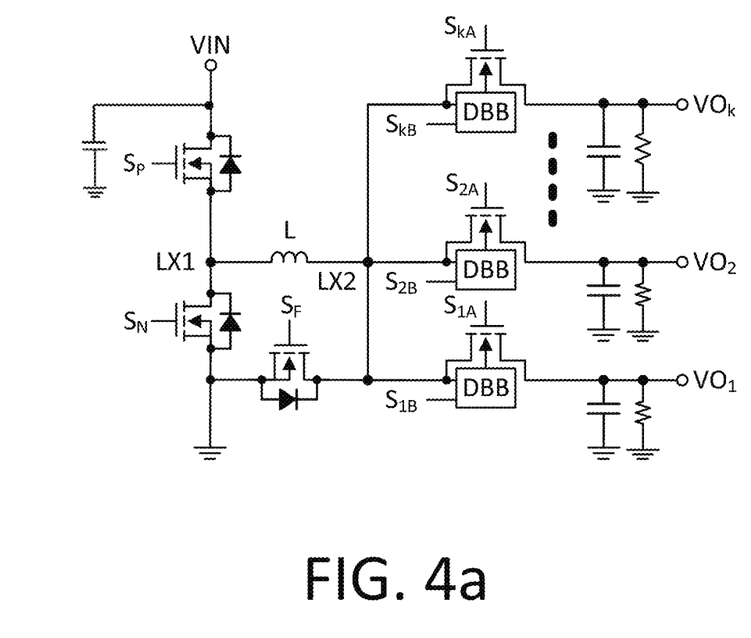
FIG. 4a illustrates a power stage with dynamic body bias (DBB) switch configuration for the single-inductor multiple-output (SIMO) DC-DC converter according an embodiment of the present invention.
Figure 4B:
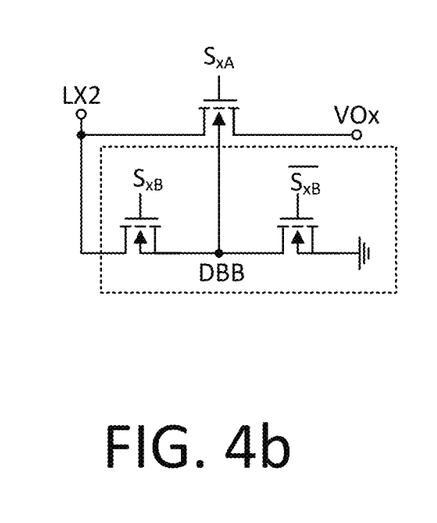
FIG. 4b illustrates dynamic body bias (DBB) circuitry according to the present invention.

In other embodiment, as depicted in FIG. 4, the back-to-back switch configurations ($S_K$, $S_{K-1A}$, $S_{K-1B}$, ..., $S_{2A}$, $S_{2B}$, $S_{1A}$, $S_{1B}$) illustrated in FIG. 3a and FIG. 3b can be replaced by a dynamic body switch between LX2 and $VO_x$, where $VO_x$ can be $VO_1$, $VO_2$, ..., $VO_K$. FIG. 4a illustrates a switch configuration with the dynamic body bias (DBB) circuitry for the SIMO DC-DC converter according to one embodiment of the present invention, in each output switch, $S_1$, $S_2$ ..., or $S_K$, its body is added a dynamic body bias (DBB) circuitry. This DBB circuitry is reported in FIG. 4b, where the body of the transistor is connected to ground when the transistor is off. This allows the transistor to block forward and reverse voltages. When the transistor turns on, the body is connected to the source, here is LX2, to ensure low threshold voltage, ensuring low on-resistance. The switch control between the body diode connecting to ground or LX2, e.g., $S_{xB}$ or $\overline{S_{xB}}$ respectively, should be non-overlap to prevent shoot-through current from LX2 to ground.

The previous mentioned SIMO DC-DC converter with back-to-back switch or DBB configuration can also operate in the following situations:

(a) If output voltage $VO_k$ is entering in pulse skipping mode (PSM) at light load, output switch $S_{k-1}$ is configured to having a body diode, its anode connects to node LX2 and its cathode connects to $VO_{k-1}$. Output switches $S_1$, $S_2$, ..., $S_{k-2}$ are configured in a way such that no body diode of the output switch can be turned on for both voltage at node LX2 is higher or lower than output voltages $VO_1$, $VO_2$, ..., $VO_{k-2}$.

(b) If $VO_k$, $VO_{k-1}$, ..., and $VO_{k-m}$ are all entering in pulse skipping mode (PSM) at light load, output switch $S_{k-m-1}$ is configured to having a body diode, its anode connects to node LX2 and its cathode connects to $VO_{k-m-1}$. Output switches $S_1$, $S_2$, ..., $S_{k-m-2}$ are configured in a way such that no body diode of the output switch can be turned on for both voltage at node LX2 is higher or lower than output voltages $VO_1$, $VO_2$, ..., $VO_{k-m-2}$.

Figure 4C:
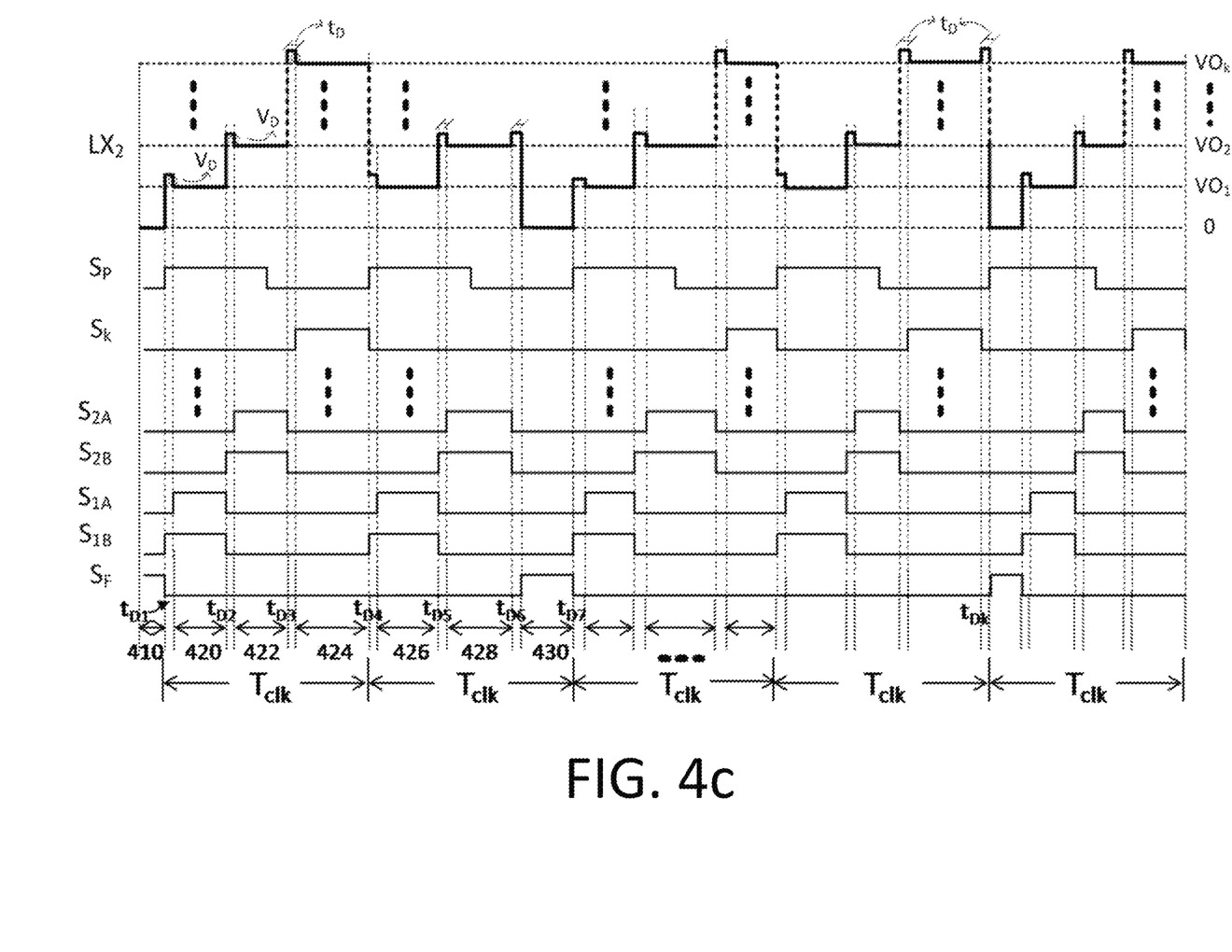
FIG. 4c depicts a timing diagram for deadtime control of a SIMO DC-DC converter according to the present invention.

As synchronous rectification is applied for high efficiency and proper output voltage control, deadtime should be managed to guarantee appropriate non-overlap between on-states of the power switches during switching transient. To perform a deadtime switch control, the back-to-back or dynamic body diode switch configurations illustrates in FIG. 4a is considered as an example. In time period 410 only freewheel switch $S_F$ is turned on, the inductor L is connected to ground, therefore the voltage at node LX2 (e.g., common inductor node) is zero. Assume $S_3 \sim S_{k-1}$ are pulse skipping in signal timing diagram (FIG. 4c). During time interval $t_{D1}$ input switch $S_p$ and output switch $S_{1B}$ are turned on, and freewheel switch $S_F$ is turned off, while all other switches remains off, because the body diode of output switch $S_{1A}$ is forward biased and the inductor current can charge output node $VO_1$, the voltage at node LX2 is $VO_1+V_D$, where $V_D$ is the body diode voltage of output switch $S_{1A}$. After passing time interval $t_{D1}$, in the next time interval 420 output switches $S_{1B}$ and $S_{1A}$ are both on, the voltage at node LX2 is $VO_1$. Similarly, in time period $t_{D2}$ output switch $S_{2B}$ is turned on, switch $S_{2A}$ remained off in this short period of time and all other output switches are off, voltage at node LX2 is $VO_2+V_D$, where $V_D$ is the body diode voltage of switch $S_{2A}$. In following time period 422 output switches $S_{2B}$ and $S_{2A}$ are both on, input switch $S_p$ remained on for a period of time shorter than time period 422 then turned off, the voltage at node LX2 is $VO_2$. In time period $t_{D3}$, output switches $S_{2B}$ and $S_{2A}$ are turned off, and all other output switches are off, the voltage at node LX2 is $VO_k+V_D$, where $V_D$ is the body diode voltage of switch $S_k$. In time period 424, output switch $S_K$ is turned on the voltage at node LX2 is $VO_k$. The time periods $t_{D1}$, 420, $t_{D2}$, 422, $t_{D3}$, and 424 represent the first clock cycle in this signal timing diagram. During time period $t_{D4}$, which is the beginning of the second clock cycle, output switch $S_k$ is off, input switch $S_p$ is turned on again, and output switch $S_{1B}$ is turned back on, the voltage at node LX2 is $VO_1+V_D$. In next time period 426, the operation of SIMO with the DBB switch configuration is the same as that described in time period 420, the voltage at node LX2 is $VO_1$. In the time period $t_{D5}$, the operation of SIMO is the same as that described in time period $t_{D2}$, the voltage at node LX2 is $VO_2+V_D$. In time period 428, the operation of SIMO is the same as that described in time period 422, the voltage at node LX2 is $VO_2$. Since assumption has been made that $S_3 \sim S_{k-1}$ are pulse skipping in the signal timing diagram. During time period $t_{D6}$, output switches $S_{2A}$ and $S_{2B}$ are turned off, the voltage at node LX2 is $VO_2+V_D$. In time period 430, $S_k$ enters pulse skipping and the freewheel switch $S_F$ is turned on and all other the remaining switches are off for the remained time period of this clock cycle, node LX2 is connected to ground, therefore the voltage at node LX2 is zero. After this time period, the operation of SIMO repeats again as it's starting from the time period $t_{D7}$, which is the beginning of the third clock cycle, as it did in the first clock cycle. Time periods $t_{D1}$, $t_{D2}$, ..., and $t_{Dk}$ represent deadtime between on-states of the power switches during switching transient. Finally, the last clock cycle shows the signal timing diagram for the last output channel $VO_K$ entering boost mode. In the case that the freewheel switch $S_F$ is turned on at the beginning of the clock cycle, deadtime period is inserted, for example $t_{Dk}$, after a plurality of previous output switches being turned off for the previous clock cycle and before a plurality of followed output switches being turned on for the followed clock cycle.

An input switch and single inductor L can control current flowing from the input voltage VIN to the common inductor node LX2. From common inductor node LX2, any of output nodes (e.g., $VO_k$, $VO_2$, and $VO_1$) across corresponding capacitor can receive inductor current using output switches (e.g., $S_k$, ..., $S_{2A}$, $S_{2B}$, $S_{1A}$ and $S_{1B}$). In this particular example, the output voltages are arranged as $VO_k$, ..., $\geq VO_2 \geq VO_1$.

FIG. 4c depicts a timing diagram for power stage switch and deadtime control of a SIMO DC-DC converter according to the DBB switch configuration proposed in FIG. 4b.

The back-to-back or DBB switch configuration of the SIMO DC-DC converter can reduce power loss by preventing output voltage shoot through between charging process for different outputs in deadtime control scheme.

In conclusion, the SIMO DC-DC converter proposed in this invention having advantages of operating in large load range, minimizing deadtime loss, and enable the last output channel operating at buck-boost mode.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A single inductor multiple-output DC-DC converter comprising:
   an inductor coupled to a first input switch and a second input switch to convert energy from supply source, wherein the first input switch is coupled to an input supply node, and the second input switch is coupled to ground, the first and the second input switches controlling a current through the inductor;
   a plurality of output switches, each output switch coupled to a common inductor node and to a corresponding output supply node, each of the output supply node having an output voltage converted from an input voltage received at the input supply node;
   a plurality of feedback signals, each of them being proportional to their corresponding output voltage of each individual output supply node;
   a freewheel switch coupled between the common inductor node and a ground;
   an oscillator provides a constant frequency clock cycle;
   wherein the first input switch is triggered at the beginning of each clock cycle;
   wherein a control signal of the first input switch is responding to the plurality of feedback signals and a sensed inductor current, and the second input switch having a control signal which is a non-overlap signal with the control signal of the first switch;
   a control circuit in response to the sensed inductor current, the plurality of feedback signals and their corresponding reference voltages, the control circuit being configured to control a timing and a charging current of the inductor through activating one of the input switches and discharging of the inductor current through activating one of the output switches sequentially;
   wherein the plurality of output switches, each of the output switches is responding to their corresponding output voltage, reference voltage and sensed inductor current;
   wherein the plurality of output switches are turned on sequentially, the last output switch is to be turned on having a remaining time period after all the other output switches are turned on sequentially; and
   wherein a difference value between the error signal output corresponding to the last output switch and a linear sum of the error signal outputs corresponding to all of the remaining outputs switches is calculated, while the difference value is positive and larger than a predetermined value, a freewheel duty cycle in response to the difference value is inserted at the beginning of the clock cycle and before the output switches turned on sequentially.

2. The single inductor multiple-output DC-DC converter of claim 1, wherein the difference value between the error signal output corresponding to the last output switch and a linear sum of the error signal outputs corresponding to all of the remaining outputs switches can be expressed as $VEA_k - (\alpha_{k-1}VEA_{k-1} + \ldots + \alpha_2 VEA_2 + \alpha_1 VEA_1)$, wherein $VEA_k$ is the error amplifier output corresponding to the last output, $VEA_{k-1}, \ldots, VEA_2, VEA_1$ represent error amplifier outputs of the remaining outputs, respectively; $\alpha_{k-1}, \ldots, \alpha_2, \alpha_1$ are constants representing the coefficients for each of the error amplifier output of the remaining outputs.

3. The single inductor multiple-output DC-DC converter of claim 1, wherein the inductor current can be discharged to a zero current at a phase where the supply nodes are operated at light load condition.

4. The single inductor multiple-output DC-DC converter of claim 3, wherein the last output supply node enters a pulse skipping mode, and a control signal of the last output switch is skipped and the freewheel switch is turned on for the remained clock period.

5. The single inductor multiple-output DC-DC converter of claim 1, wherein one of the plurality of the output switches corresponding to one of the plurality of output supply nodes having a highest voltage is configured to have a body diode, its anode is connected to the common inductor node and its cathode is connected to the corresponding output supply node, wherein the remaining output switches are configured in a way such that none of a body diode of each of the remaining output switches can be forward biased, whether the voltage at the common inductor node is higher or lower than the output voltages of the corresponding remaining output switches.

6. The single inductor multiple-output DC-DC converter of claim 5, wherein one of the output supply node having the highest voltage enters pulse skipping mode, the output switch corresponding to one of the output supply node having a second highest voltage is configured to having a body diode, its anode connects to the common inductor node and its cathode connects to the output supply node having the second highest voltage, wherein the remaining output switches are configured in a way such that none of a body diode of each of the remaining output switches can be forward biased, whether the voltage at the common inductor node is higher or lower than the output voltages of the corresponding remaining output switches.

7. The single inductor multiple-output DC-DC converter of claim 6, wherein a portion of the plurality of output supply nodes having voltages from highest to lowest among them enter pulse skipping mode at light load, the output switch corresponding to one of the output supply node having a highest voltage excluding the portion of the plurality of output supply nodes entering the pulse skipping mode is configured to having a body diode, its anode connects to the common inductor node and its cathode connects to the output supply node having the highest voltage excluding the portion of the plurality of output supply nodes entering the pulse skipping mode, wherein the remaining output switches are configured in a way such that none of a body diode of each of the remaining output switches can be forward biased, whether the voltage at the common inductor node is higher or lower than the output voltages of the corresponding remaining output switches.

8. The single inductor multiple-output DC-DC converter of claim 7, wherein a plurality of deadtime periods are inserted after the plurality of output switches being turned-off in their corresponding previous clock cycle and before the plurality of followed output switches being turned-on in the following clock cycle; during the plurality of deadtime periods, each of the output switches is configured to have a body diode, its anode connects to the common inductor node and its cathode connects to the output supply node.

9. The single inductor multiple-output DC-DC converter of claim 1, wherein the control circuit further comprises:
  an energy distributing unit configured to measuring the energy required by all the output supply nodes, by comparing their reference voltage at each output;
  an energy generating unit configured to extracting energy from the input supply node to ensure no total voltage error through the feedback signals; and
  a plurality of error amplifiers (EAs), each of the error amplifiers being respectively placed in the feedback loops coupled to the corresponding output supply node to sense their voltage level and each of them having a reference voltage to individually control their error.

10. The single inductor multiple-output DC-DC converter of claim 9, wherein the control circuit further comprises:
  a summing circuit calculates a difference value between the error amplifier output corresponding to the last output and a linear sum of the error amplifier outputs corresponding to all of the remaining outputs, while the difference value is positive and larger than a predetermined value, a freewheel duty cycle proportional to the difference value is inserted at the beginning of the clock period and before the output switches turned on sequentially.

11. The single inductor multiple-output DC-DC converter of claim 9, wherein the control circuit further comprises:
  providing control protocols, while one or plurality of the error amplifier outputs lower than a certain value, the corresponding one or plurality output switches is skipped at the corresponding duty cycle;
  wherein the corresponding last error amplifier output is lower than a certain value, the corresponding output switch is skipped and the freewheel switch is turned on for the remained clock period.

* * * * *